United States Patent
Costa, Jr. et al.

(10) Patent No.: US 11,720,333 B2
(45) Date of Patent: Aug. 8, 2023

(54) EXTENDING APPLICATION LIFECYCLE MANAGEMENT TO USER-CREATED APPLICATION PLATFORM COMPONENTS

(71) Applicant: Microsoft Technology Licensing, LLC, Redmond, WA (US)

(72) Inventors: Marcio Costa, Jr., Kirkland, WA (US); Emma Chantal Oberstein, Brooklyn, NY (US); Vinay Singh, Redmond, WA (US); Shannon Ronald McArthur, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/510,368

(22) Filed: Oct. 25, 2021

(65) Prior Publication Data

US 2023/0127029 A1    Apr. 27, 2023

(51) Int. Cl.
*G06F 8/70* (2018.01)
*G06F 8/41* (2018.01)

(52) U.S. Cl.
CPC .............. *G06F 8/433* (2013.01); *G06F 8/447* (2013.01); *G06F 8/457* (2013.01); *G06F 8/70* (2013.01)

(58) Field of Classification Search
CPC .......... G06F 8/433; G06F 8/447; G06F 8/457; G06F 8/70
USPC ........................................................ 717/154
See application file for complete search history.

(56) References Cited

U.S. PATENT DOCUMENTS

| 7,406,603 | B1 * | 7/2008 | MacKay | G06F 21/16 |
| | | | | 726/16 |
| 9,286,329 | B2 * | 3/2016 | Svarovsky | G06F 16/212 |
| 2007/0234291 | A1 * | 10/2007 | Ronen | G06F 8/36 |
| | | | | 717/120 |
| 2008/0270350 | A1 * | 10/2008 | Bojanic | G06F 16/254 |
| 2015/0007169 | A1 * | 1/2015 | Li | G06F 8/70 |
| | | | | 717/176 |
| 2016/0048408 | A1 * | 2/2016 | Madhu | H04L 47/783 |
| | | | | 718/1 |
| 2016/0360059 | A1 * | 12/2016 | Homma | H04N 1/00244 |

(Continued)

OTHER PUBLICATIONS

Title: Software deployment, past, present and future, author: A Dearle, publication date: 2007.*

(Continued)

*Primary Examiner* — Chameli Das
(74) *Attorney, Agent, or Firm* — Barta, Jones & Foley, PLLC

(57) ABSTRACT

The examples described herein extend application lifecycle management (ALM) processes (e.g., create, update, delete, retrieve, import, export, uninstall, publish) to user-created application platform components. First and second components are generated within an application platform. The first component is customized at least by indicating whether the first component is subject to localization, defining a layering of the first component, and indicating whether the first component is protected from downstream modification. The second component is customized in accordance with customizing the first component, and is further customized by defining a dependency of the second component on the first component. The components are deployed in a target environment with metadata representing the customizations and enabling the ALM processes.

20 Claims, 16 Drawing Sheets

(56) References Cited

U.S. PATENT DOCUMENTS

| | | |
|---|---|---|
| 2019/0138299 A1 | 5/2019 | Ma et al. |
| 2019/0340518 A1* | 11/2019 | Merrill ............... G06Q 10/0633 |
| 2020/0089484 A1* | 3/2020 | Broas .................... G06F 9/4418 |
| 2020/0264848 A1 | 8/2020 | Stober et al. |
| 2020/0409665 A1 | 12/2020 | Swaminathan et al. |
| 2021/0326368 A1* | 10/2021 | Binjrajka ............ G06Q 10/0633 |
| 2022/0236976 A1* | 7/2022 | Wiegley .................... G06F 8/65 |

OTHER PUBLICATIONS

Title: On the development of new modeling concepts for product lifecycle management in engineering enterprises, author: M Eigner, publication date: 2010.*

Title: Engage: a deployment management system, author: J Fischer, publication on 2012.*

Title: Mapping abstract complex workflows onto grid environments, author: E Deelman, published on 2003.*

Title: Engage: a deployment management system, author: J Fischer, published on 2012.*

"International Search Report and Written Opinion Issued in PCT Application No. PCT/US22/038420", dated Oct. 19, 2022, 15 Pages.

* cited by examiner

| new_pizzaBase |
|---|
| PK   new_pizzaId: UniqueIdentifier |
| new_name: Varchar |
| ... |
| SolutionId: UniqueIdentifier |
| ComponentState: Integer |
| OverwriteTime: DateTime |
| IsCustomizable: Bit |
| IsManaged: bit |
| ComponentIdUnique: UniqueIdentifier |

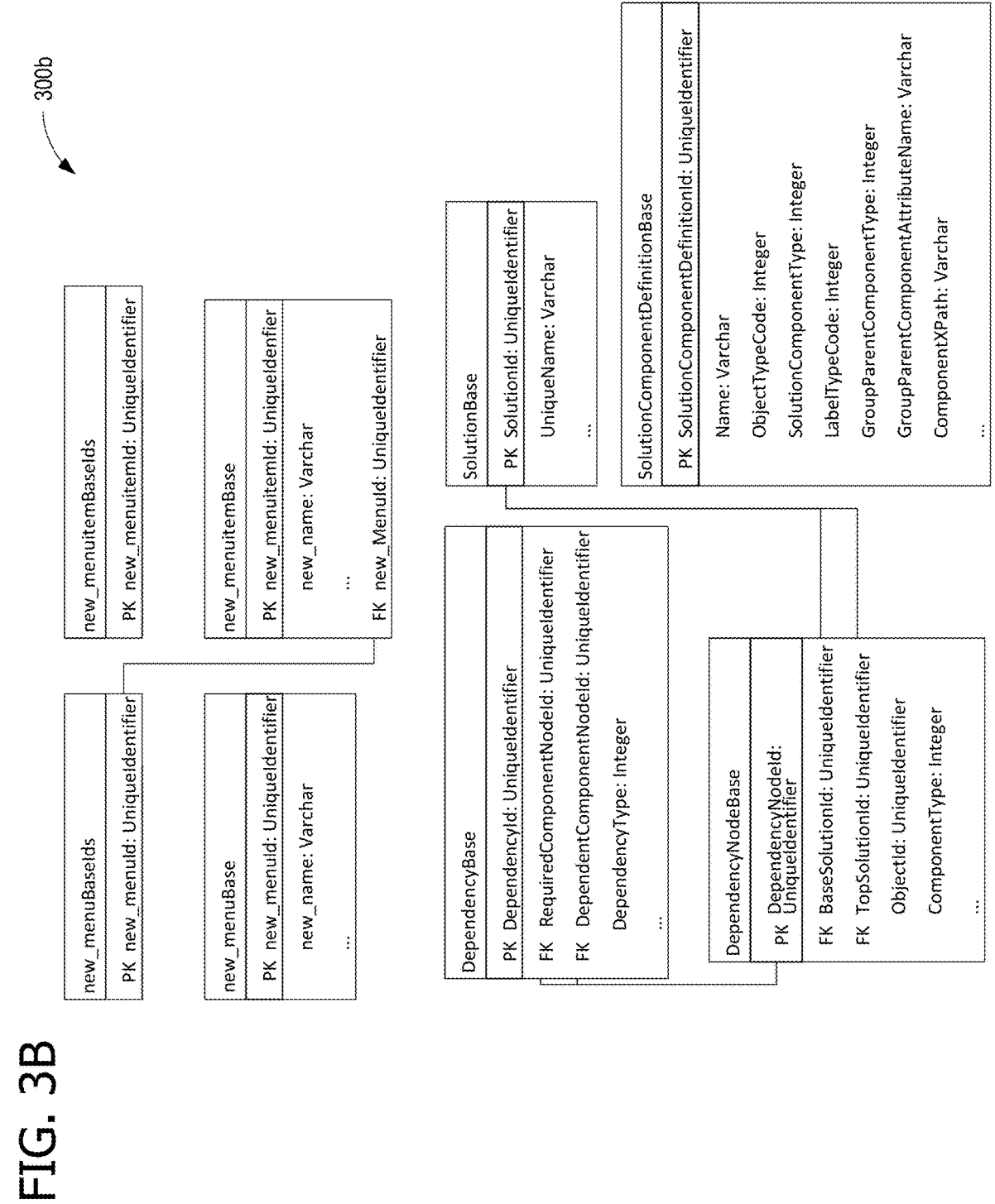

EXTENDING APPLICATION LIFECYCLE MANAGEMENT TO USER-CREATED APPLICATION PLATFORM COMPONENTS

BACKGROUND

Business productivity tools such as low-code application platforms (LCAPs) enable organizations to develop their own custom tools rapidly and easily, to accomplish tasks such as visualizing data, managing business workflow, automating graphical user interfaces, creating chatbots, and producing custom applications, using low-code or no-code interfaces.

Application lifecycle management (ALM) includes processes that manage the life cycle of applications from conception to end of life, providing a framework for software development through managing the software over time (e.g., deployment, updates, rollback, and uninstallation). The ease of development of applications using LCAPs has historically excluded user-created LCAP components from benefitting from many of the ALM processes.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some examples extend application lifecycle management processes to user-created application platform components, such as in a low-code application platform (LCAP). Within an application platform, a first component and a second component are generated. The first component is customized at least by defining a layering of the first component, and indicating whether the first component is protected from downstream modification. The second component is customized in accordance with customizing the first component, and is further customized to define a dependency of the second component on the first component. First metadata for the first component representing the customizations made to the first component is stored. Second metadata for the second component representing the customizations made to the second component is stored. The first component and the second component are deployed with the first metadata and the second metadata.

BRIEF DESCRIPTION OF THE DRAWINGS

The disclosed examples are described in detail below with reference to the accompanying drawing figures listed below:

FIGS. 3A-3E illustrate exemplary metadata as may be used by the arrangement of FIG. 1;

FIG. 4 shows an exemplary screenshot of the SCF UI, as may be displayed when defining component dependency with the arrangement of FIG. 1;

Corresponding reference characters indicate corresponding parts throughout the drawings.

DETAILED DESCRIPTION

Figure 1:
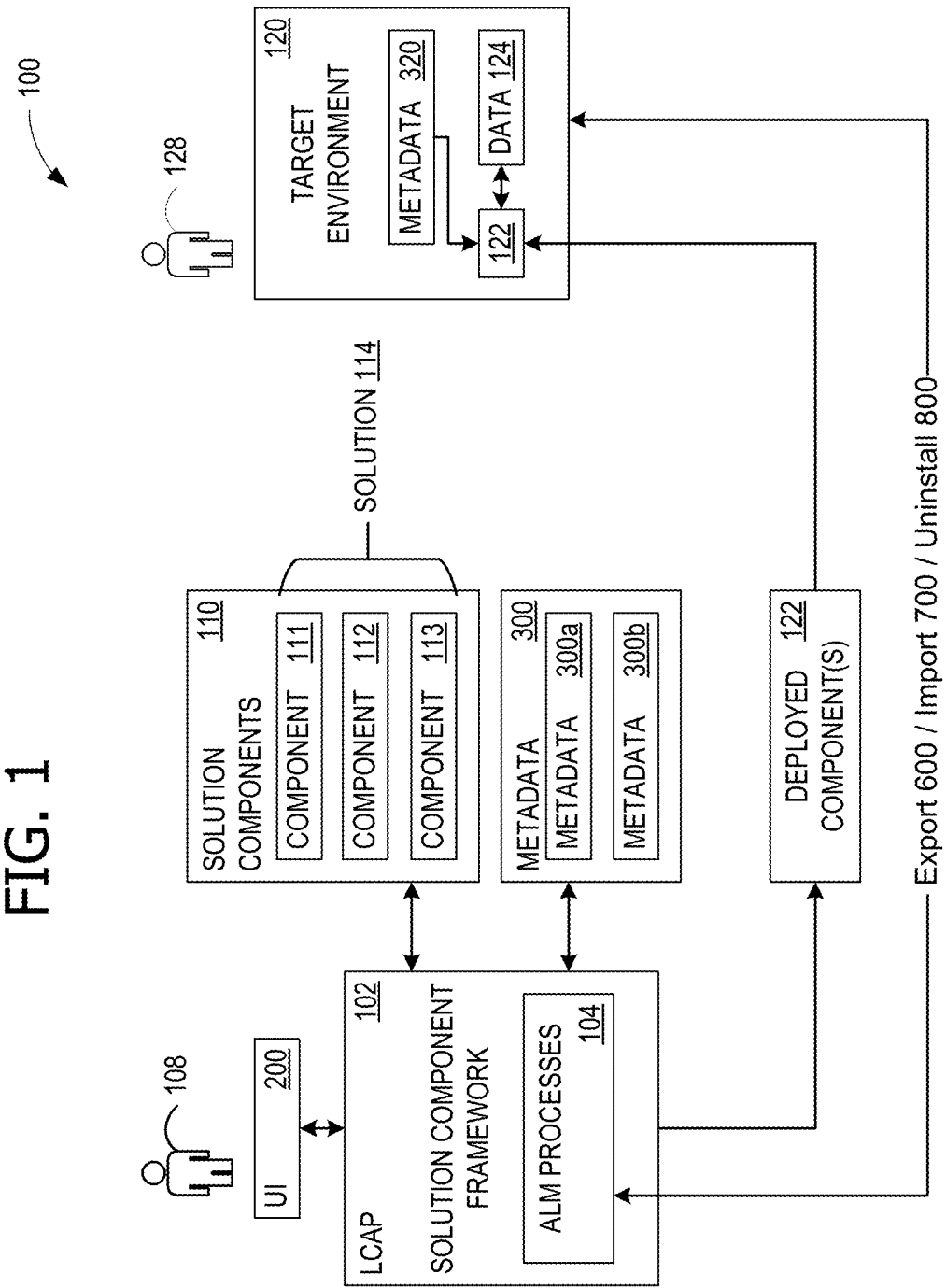
FIG. 1 illustrates an arrangement for advantageously extending application lifecycle management processes to user-created application platform components.

The various examples are described in detail with reference to the accompanying drawings. Wherever possible, the same reference numbers are used throughout the drawings to refer to the same or like parts. References made throughout this disclosure relating to specific examples and implementations are provided solely for illustrative purposes but, unless indicated to the contrary, are not meant to limit all examples.

Some examples extend application lifecycle management processes to user-created application platform components, such as in a low-code application platform (LCAP). Within an application platform, a first component and a second component are generated. Example components include entities (e.g., tables), processes (e.g., general automation), forms (e.g., a user interface (UI) for an entity), bots (e.g., artificial intelligence), and others. Components can be combined to build solutions (e.g., data flows). The first component and the second component are customized based on input from a user or code, and the second component is made dependent on the first component. Dependencies prohibit uninstalling components when dependent components remain installed. The customizations are stored as part of metadata associated with the components. The metadata enables application lifecycle management (ALM) processes to be associated with these user-created components. The first component and the second component are then deployed in a target environment. In some examples, the LCAP comprises a solution component framework (SCF).

Aspects of the disclosure improve the operations of computing resources by permitting user-created LCAP solution components to benefit from the wide range of common ALM processes, such as deploying, updating, and uninstalling. Aspects of the disclosure operate in an unconventional manner by storing certain metadata for user-created components that opens up advantageous customizations, such as localization for any component field and protection from downstream modification. Some examples further improve low-code operation to no-code operation, leveraging graphical user interfaces (UIs) to accept customization configuration selections, thereby expanding the user base to even users who do not possess coding skills.

Because the customizations are driven by UIs, rather than written in code, computing resources usage is reduced, thereby improving the functioning of the underlying device. Further, development time for new solution-aware components is reduced, and operational reliability is improved even as testing requirements are lessened thus improving the device. The underlying LCAP framework orchestrates operations, for example by enforcing user-defined dependencies. That is, users are able to define dependences among components, and the framework then either permits or prevents certain changes based on whether attempted changes would break a dependency. Other user-defined customization aspects are similarly managed to provide reliable operation of solutions and components.

FIG. 1 illustrates an arrangement 100 for advantageously extending ALM processes to user-created LCAP components used in a solution. In some examples, a solution is a package in which customized components of a particular project are stored. Customizers and developers (e.g., users 108) distribute solutions so that business functionalities may be transported to customers 128. In FIG. 1, user 108 is tasked with building a solution 114, such as a deployable application ("app") that uses a set of customized solution components 110, for example a component 111, a component 112, and a component 113. To accomplish this, user 108 uses an LCAP 102 (which comprises an SCF, in some examples) and interfaces with LCAP 102 using a UI 200. LCAP 102 is able to implement ALM processes 104, which are described in further detail below. Some of these processes include an export process 600, illustrated in FIG. 6, an import process 700, illustrated in FIG. 7, and an uninstall process 800, illustrated in FIG. 8. In some examples, uninstall process 800 is also used for updating.

Metadata for component 111, component 112, and component 113 are stored in metadata 300, shown as containing at least metadata 300a and metadata 300b. Further detail is shown in FIGS. 3A-3E. The solution created by user 108 is deployed, as deployed components 122, to a target environment 120 for use by a customer 128. For example, user 108 may be writing an app for customer 128 to use. Target environment 120 has metadata 320, which may be copied or derived from metadata 300, and data 124 for use by, and in support of, deployed components 122.

Figure 5:
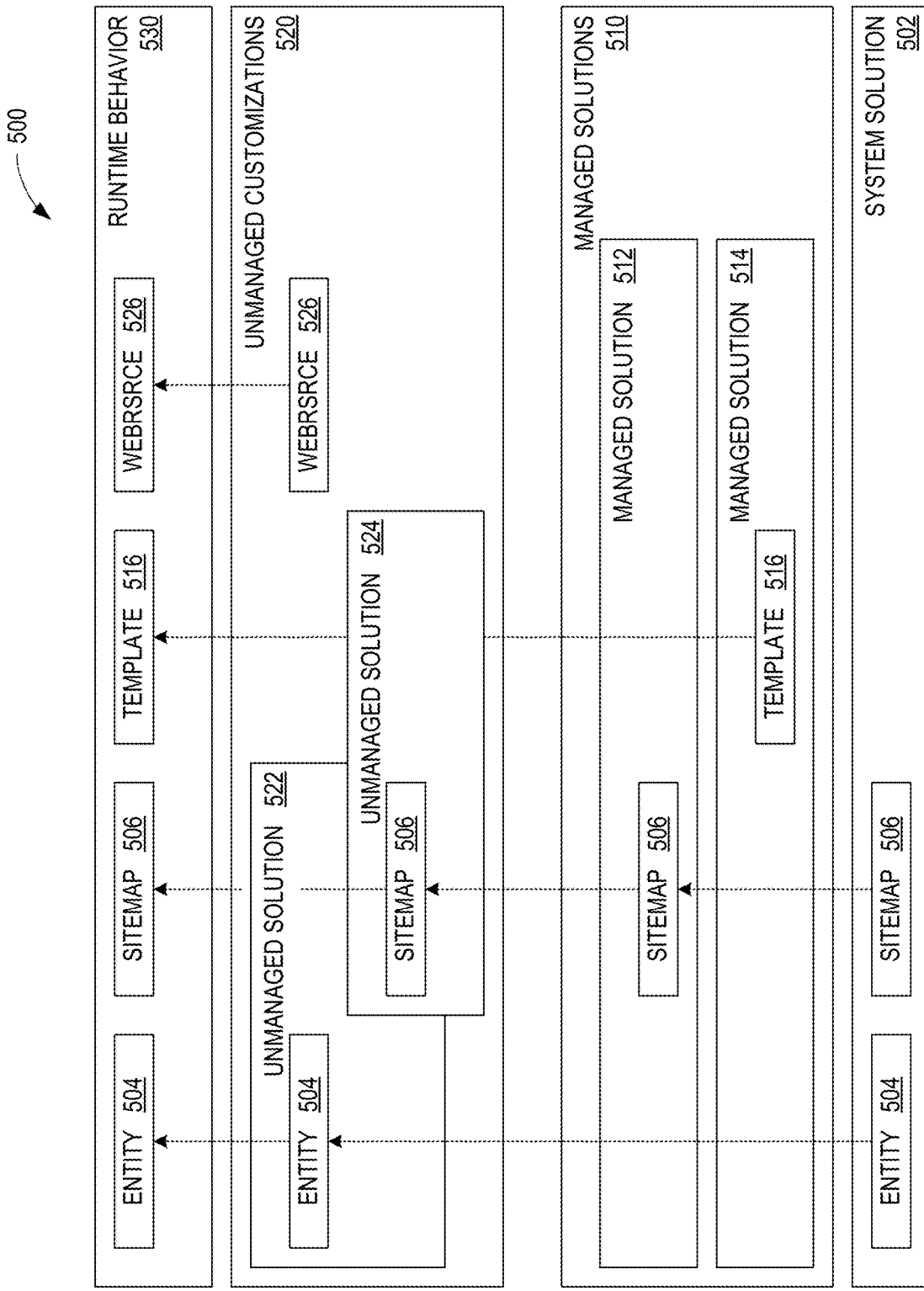
FIG. 5 illustrates a graphical view of a layering, as may occur in the arrangement of FIG. 1.

Each of component 111, component 112, and component 113 supports ALM, and may be stacked to provide layering, as indicated in FIG. 5. This permits retaining records of prior customization and enabling reverting changes (e.g., updates) via uninstall operations (e.g., uninstall process 800, see FIG. 8) Publishers hold ownership of components shipped as part of a managed solution, and a particular publisher is able to protect components from other users' modification and deletion attempts. In some examples, users are able to identify which solutions installed particular components, so that the users may work with those component's owners to build on top of those components (e.g., layer).

When a new component is created (e.g., generated), such as component 111, a table is created with full layering support. Extensibility points are added for create, retrieve, update, delete (together CRUD), and also import, export, uninstall, and publish. This information is saved within metadata 300 (e.g., as metadata 300a). Forms are created to permit user 108 to customize the component using UI 200. An example of UI 200 is shown in FIG. 2. Relationships are created for supporting auditing and process automation, and views are created for runtime consumption of the top layer.

Solution components (e.g., components 111-113) represent different aspects of a platform, such as: entities (e.g., tables), processes (e.g., general automation), forms (e.g., a UI for an entity), bots (e.g., artificial intelligence), and others. Developers (e.g., user 108) use various solution components, in LCAP 102, to rapidly build reliable solutions that fulfill business needs. Entities define the shape of an object that represents an artifact of a business, and, in some examples, have full ALM support without the need of custom code (e.g., from a user) to facilitate transport (e.g., deployment). By enabling an entity to experience full ALM support (e.g., data import, export, and uninstall), it is rendered into a "solution-aware" solution component.

Figure 2A:
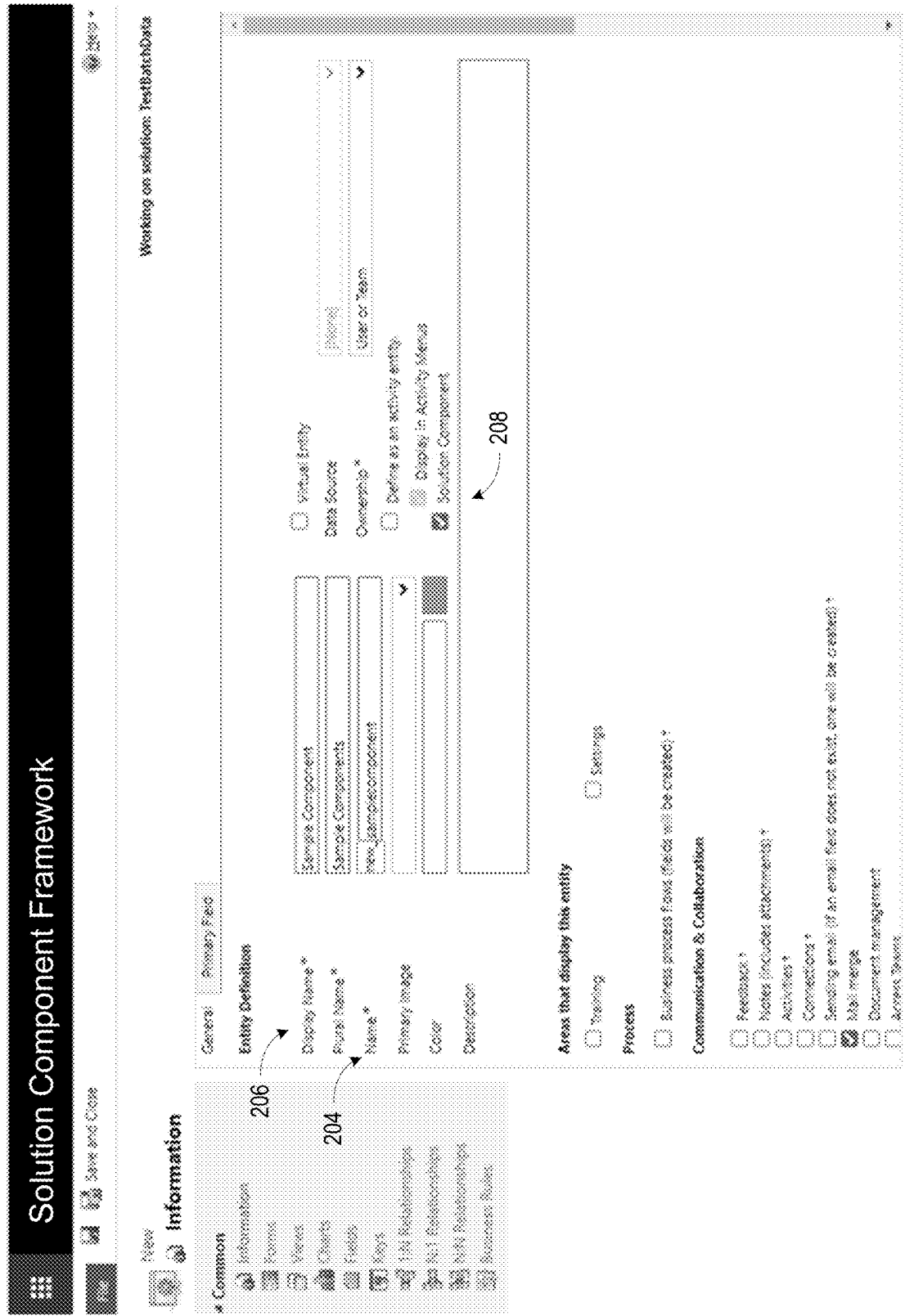
FIGS. 2A and 2B show exemplary screenshots of a solution component framework (SCF) user interface (UI), as may be displayed by the arrangement of FIG. 1.

Component registration for ALM occurs when an entity is generated (e.g., created) in LCAP 102 by setting a property or field (such as setting IsSolutionAware to True), or when the same property is enabled in an existing entity. User 108 is able to change the value of this property via UI 200 or, in some examples, programmatically via a software development kit (SDK). A screenshot 202 of UI 200 is shown in FIG. 2A for a component having a name 204 and a display name 206. A Solution Component checkbox 208 is checked, so the component will be a solution aware solution component. When an entity is created or updated with the IsSolution-Aware property set to true, LCAP 102 will create the necessary artifacts for ALM support.

In some examples, these artifacts include table columns to allow solution layering (e.g., SolutionId, ComponentState, and OverwriteTime) and a table column for publisher customization control (e.g., IsCustomizable). These example artifacts are illustrated in FIG. 3A. Solution layering (depicted graphically in FIG. 5) is used to stack customizations together where the topmost layer defines runtime behavior for a solution. This permits changing runtime behavior of a component easily, by importing a solution on top of an identified component whose runtime behavior is to be changed. A publisher (e.g., user 108) is an owner of a group of solutions, and some examples of LCAP 102 may be used for development of multiple different solutions simultaneously, by multiple different publishers. A publisher holds ownership of a solution, and therefore, holds ownership over components within that solution. Thus, when a solution component is declared as not customizable, only the publisher owner of that component is permitted to create (e.g., generate, make) customizations on top of it. Once a component is defined, it is visible for consumption.

Figure 2B:
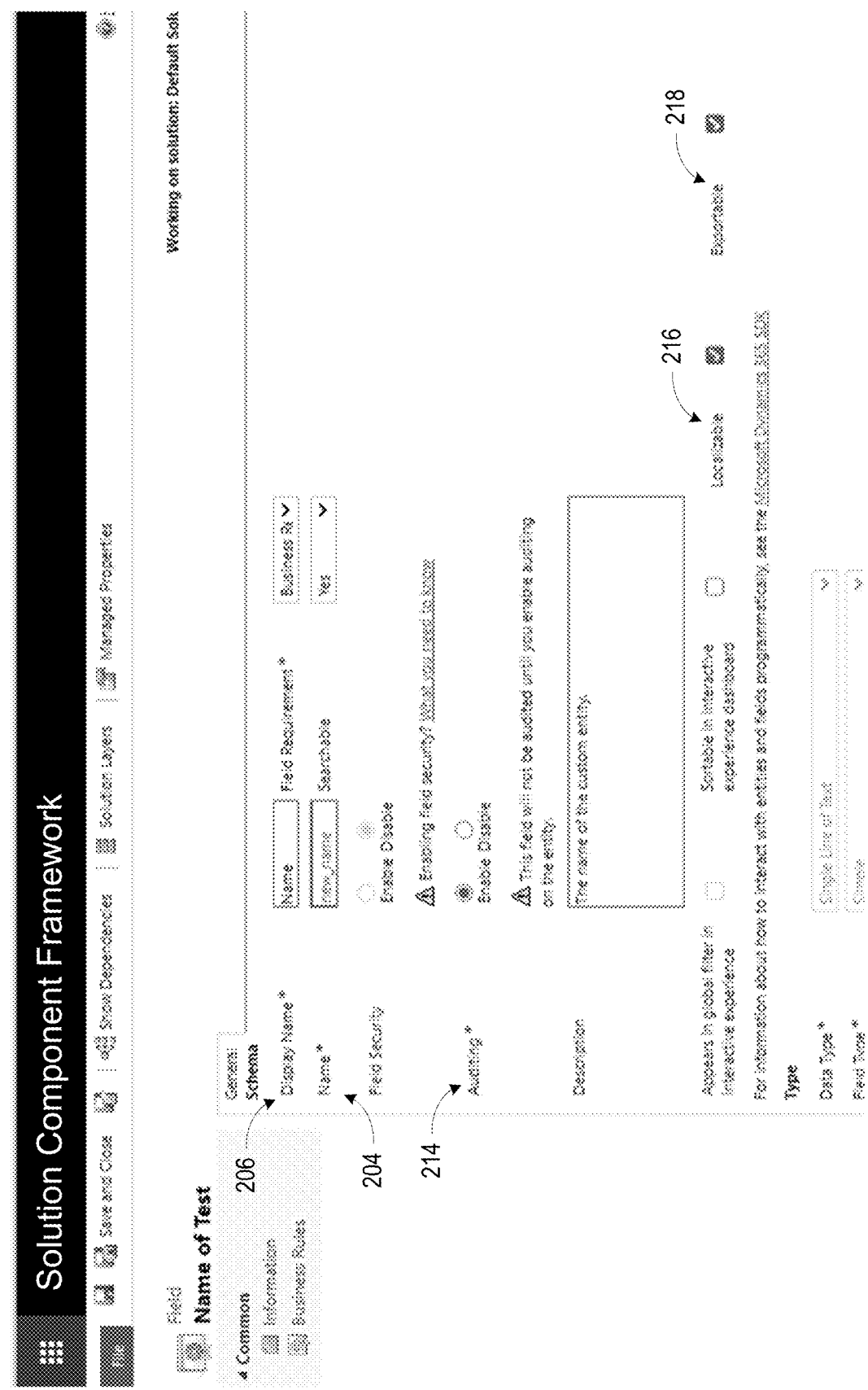

FIG. 2B shows another example screenshot 212 of example UI 200 (e.g., of a field customization panel) with multiple options identified as enabled. For example, an Auditing radiobox group has Enabled checked, rendering the subject component auditable, a Localization checkbox 216 is checked, so the component is localizable, and an Exportable checkbox 218 is checked, so the component is exportable (e.g., may be deployed).

Some users may need a solution or component to support multiple languages, for example, when customers 128 span multiple countries and/or language groups. The ability to reuse a single component, and selectively replace textual items with corresponding text in a selected language, is referred to as localization. Components generated by LCAP 102 support localization. User 108 may declare a field as localizable and LCAP 102 supports the creation of labels for that field. One way this may be accomplished is by Localization checkbox 216, precluding the necessity of custom code to achieve the same result.

In some examples, user 108 also determines which components will be exposed. In some examples, all properties of a solution component are represented in a solution, with the exclusion of properties with empty or null values. However, in some scenarios, user 108 may choose to exclude other properties. To accomplish this, user 108 unchecks Exportable checkbox 218.

Figure 3C:
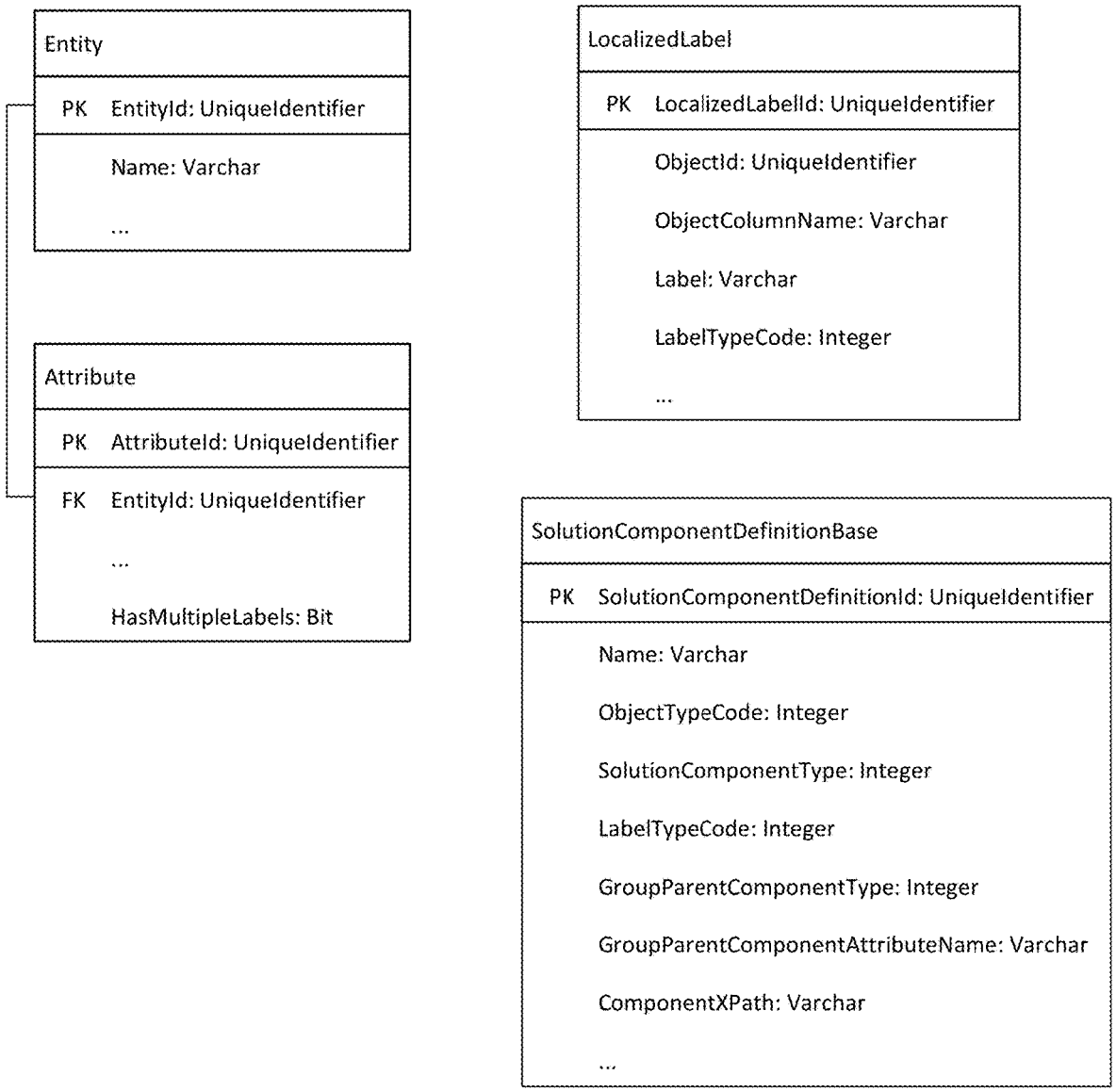

FIGS. 3A-3E illustrate exemplary metadata as may be used by arrangement 100. An example of metadata 300a, shown in FIG. 3A, is created when Solution Component checkbox 208 is checked (see FIG. 2A). SolutionId is an Identifier of the solution owner of that layer, and is used for dependency determinations or set to a base value. ComponentState represents the runtime behavior of the specific layer, with values: 0—Published (instance is visible for runtime consumption); 1—Unpublished (instance is in draft state, only visible for designers); 2—Deleted (instance is not visible for runtime and design consumption, e.g., an undo candidate); and 3—Unpublished Deleted (instance is not visible for runtime, but can still be visible for designers as "to be removed").

There are scenarios in which a solution component instance is not ready for consumption, and is in draft state (e.g., ComponentState is set to 1). There are also scenarios in which a solution component instance is no longer useful for consumption, and is in a deleted or unpublished deleted state (e.g., ComponentState is set to 2 or 3). In some examples, a publisher is able to declare a particular component as eligible for soft delete. A soft deleted component is a component instance not available for runtime consumption, but yet is still present in the environment, allowing user 108 to undo the deletion when necessary.

OverwriteTime is a timestamp of when the layer was overwritten. If a layer has not been overwritten by any other solution, it is considered the top layer and defines the runtime behavior. IsCustomizable indicates whether a record is available for customization or whether only the owning publisher is permitted to modify the record. IsManaged indicates whether a record belongs to a manager solution. ComponentIdUnique is a unique layer identifier used for solution uninstallation. In some examples, system views are automatically created views for easy access to top layers, so that it is not necessary to determine the top layer upon data retrieval.

FIG. 3B shows an example of metadata 300b, in which PK means primary key and FK means foreign key. A foreign key ensures data consistency across layers in the absence of dependencies. An identifier (ID) table tracks all keys corresponding to a particular solution component in a parent table. This permits other tables to create FKs to the component's table, given that a PK is consistent same across different solution layers. A dependency table stores information regarding how the dependent nodes are connected, which is used to determine and enforce dependencies.

SolutionComponentDefinitionBase represents different, example solution aspects of a component and dictates the ALM behavior of a solution-aware entity. Name is the platform name of the entity. ObjectTypeCode is an integer representation of an entity. SolutionComponentType is an integer representation of a component. LabelTypeCode is an integer representation of a localizable component. GroupParentComponentType is a SolutionComponentType of the parent component (when applicable). GroupParentComponentAttributeName is a PK column of the parent component (when applicable). ComponentXPath is an extensible markup language (XML) root node representation in a solution file.

FIG. 3C shows an example of metadata 300c which, along with metadata 300d and 300e, is also within metadata 300 (but not shown in FIG. 1, in order to avoid cluttering FIG. 1). In SolutionComponentDefinitionBase, LabelTypeCode is an integer representation of a localizable component. In Attribute, HasMultipleLabels identifes labels in different languages for localization.

LocalizedLabel stores translations for a particular string represented in a Label column. ObjectId column corresponds to the PK of the record owner of that translation, and LabelTypeCode indicates in which table a record is stored. ObjectColumnName represents a column corresponding to a label that is replaced at runtime with the corresponding translation, when a different language context is used. ObjectColumnName matches with name of the Attribute having the HasMultipleLabels set to true. HasMultipleLabels is set to true when creating or updating a field if Localization checkbox 216 is checked.

Figure 3D:
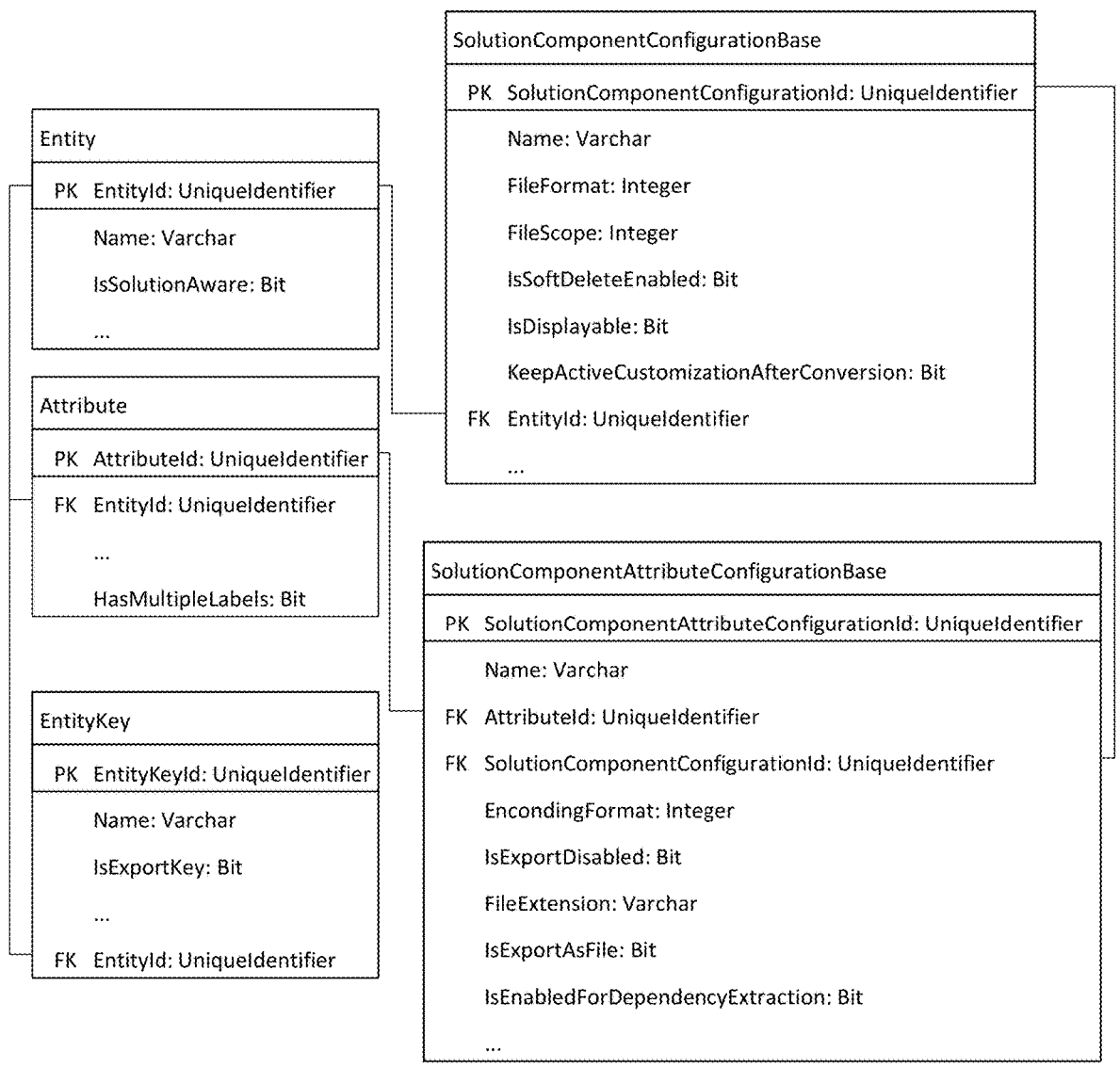

FIG. 3D shows an example of metadata 300d. SolutionComponentConfigurationBase is a configuration entity representing different aspects of the source control representation of a solution component, in addition to dictating how the component is visible. FileFormat is an integer representing the file format of a record in source control, with: 0—XML; and 1—JSON (Javascript object notation). FileScope is an integer representing the folder structure of components in source control, with: 0—No source control support; 1—Individual folder structure (components may be grouped in sub-folders partitioned based on their relationships); and 2—Global file or Single file under a folder that represents all instances of that component. In some examples, different folder structures may be used: global (all the data will be present in a single file under a system generated folder); and individual (each component will have its own separate folder, and each instance of that component will have its own file). In some examples, a component instance may be represented in either XML or JSON formats. IsSoftDeleteEnabled identifies whether a solution component is eligible for having instances in soft delete mode (ComponentState=2). IsDisplayable is used for selecting component visibility options.

SolutionComponentAttributeConfigurationBase is a configuration entity representing different aspects of the source control representation of an Attribute. EncodingFormat identifies an encoding algorithm used for storing the content of a field, with: 0—No encoding is applied; 1—Base64; and 2—UTF8 (unicode transformation format—8-bit). FileExtension are extension to be appended to a file (e.g., .png, .jpeg,). IsExportDisabled indicates whether a field should be excluded from an exported component file. IsExportAsFile indicates whether the content of a field should be exported as a file, respecting the extension expressed on the FileExtension property. IsEnabledForDependencyExtraction indicates whether the content of a field should be considered for additional dependency declaration. An Export Key is an alternate key that represents an identifier of a component in a solution file. IsExportKey indicates whether the EntityKey record representing an alternate key should be considered as an Export Key.

Figure 3E:
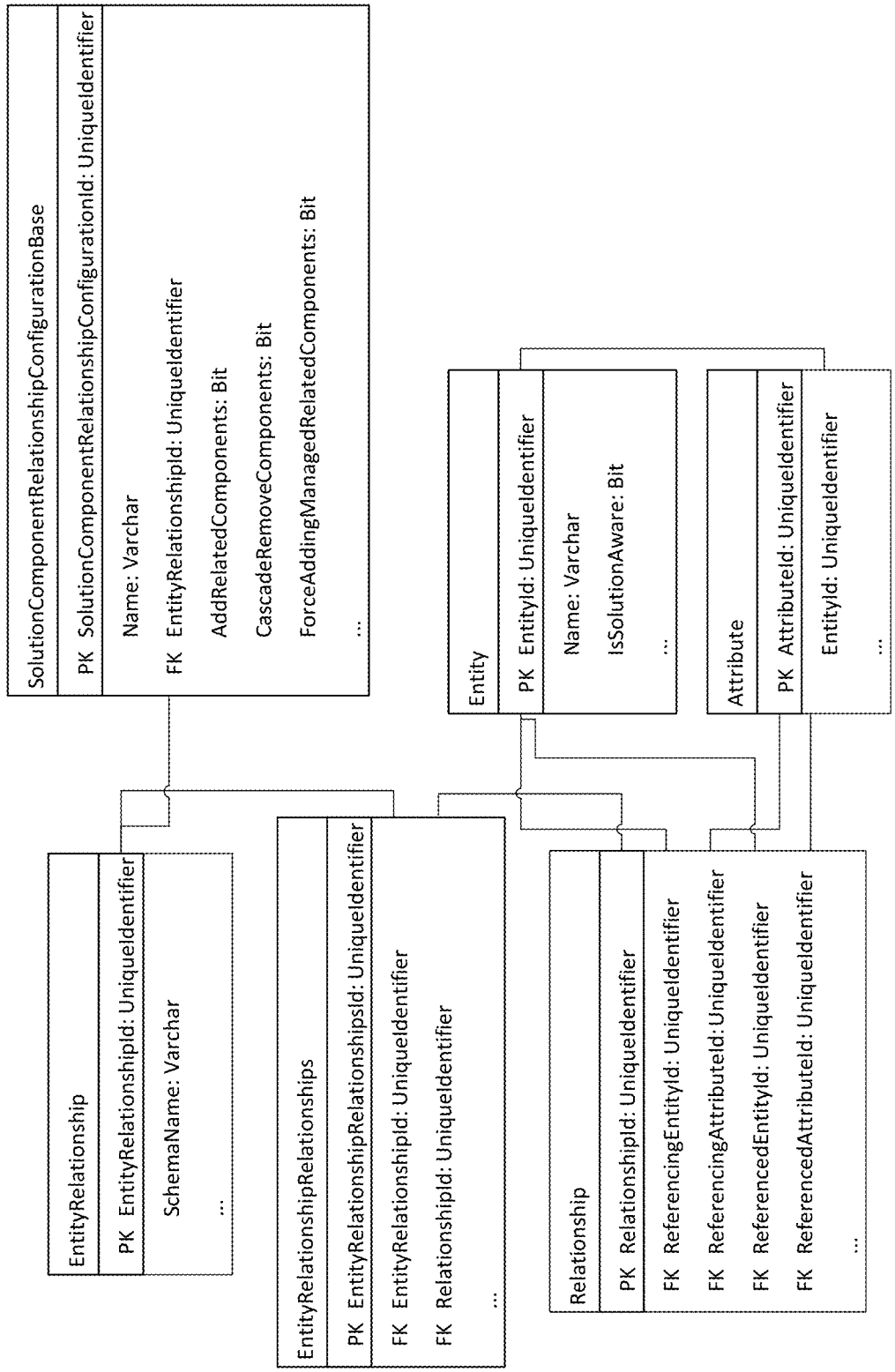

FIG. 3E shows an example of metadata 300e. SolutionComponentRelationshipConfigurationBase is a configuration entity responsible for dictating the solution development behavior of related components (e.g., solution-aware entities sharing a relationship). AddRelatedComponents indicates whether referencing records should be automatically added to a solution when a referenced record is added. In some examples, components sharing an N-to-1 of type Parent-Child or an N-to-N relationship behave as if this property is set to true. CascadeRemoveComponents indicates whether referencing records should be automatically removed from a solution whenever a referenced record is removed. ForceAddingManagedRelatedComponents indicates whether LCAP 102 should add referencing records to a solution even when the referencing records are managed.

Figure 4:
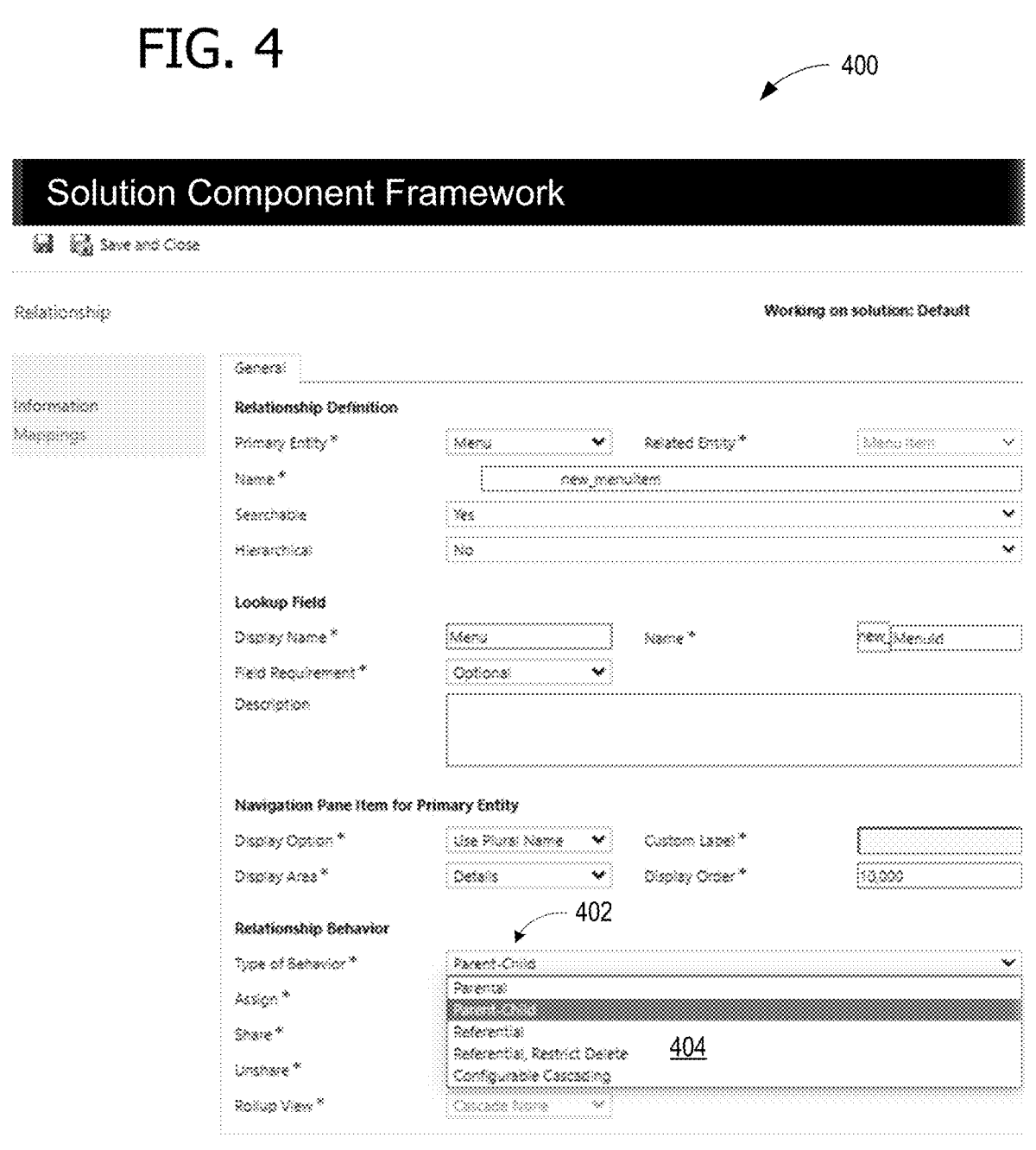

LCAP 102 permits user 108 to declare dependencies via relationships to other entities declared as solution components (e.g., component 112 may depend on component 111). FIG. 4 shows an exemplary screenshot 400 that may be displayed by UI 200 to enable user 108 to assign a dependency relationship between two components. If a solution component has a reference to another solution component via a relationship, that reference is treated as a dependency.

Dependencies help to ensure data consistency by rejecting delete requests of a particular solution component if there is another solution component that references the object that is the subject of the deletion attempt. When the referenced component is being removed, a determination is made whether the referenced component is required. If so, the deletion attempt is rejected, due to potential data corruption risks, and UI 200 will present user 108 with an error message.

In some examples, dependency determination occurs in multiple phases. Components are identified, along with relation declarations. The nodes are formed into a tree, with nodes linked according to the relation declarations. Duplicate links are removed. For example, if a node is linked to both a parent and a grandparent, and the node's parent is also linked to the grandparent, then the node's link to the grandparent is a duplicate link and may be removed (e.g., because the parent's link to the grandparent protects the node).

Multiple dependency types are supported, including: positional, relational, referential, and custom. Positional dependencies are declared based on the component positioning relative to other components. Relational dependencies are declared based on the relationships a component has with other solution aware entities. Referential dependencies are declared based on the references a component has with other solution aware entities. In some examples, custom dependencies may be collected from custom functionality. Dependencies may be persisted after calculation.

In FIG. 4, a selection window 402 in UI 200 (displayed in screenshot 400) permits user 108 to select a relationship behavior from a menu 404 of supported relationship behavior. Multiple cascade options are available, including: Parental (when the referenced entity record is deleted, all referencing records are also deleted); Parent-Child (same as Parental, but including that the child inherits the parent's behavior); Referential (when the referenced entity record is deleted, the reference field becomes empty); Restrict Delete (the system blocks the delete of an entity record if a reference exists); and Custom (user 108 defines what happens when a referenced entity record is deleted).

FIG. 5 illustrates a graphical view 500 of a layering, as may occur in arrangement 100. A base layer is at the bottom of a layer stack, for example, a system solution layer 502 forms a base layer. As illustrated, a basic entity 504 and a sitemap 506 (e.g., a sitemap for a website) are initially present in system solution layer 502. Sitemap 506 and a template component 516 are each customized by user 108 in LCAP 102 to become customized solution components, similar to components 111 and 112, in a set of managed solutions 510. In this example, sitemap 506 is part of a managed solution 512, and template component 516 is part of a managed solution 514.

Another user (e.g., a downstream user such as customer 128) further customizes entity 504 and sitemap 506 in a set of unmanaged customizations 520. In this scenario, sitemap 506 had not been protected from downstream changes. Entity 504 (now customized) and sitemap 506 (now customized in one layer by user 108 and a second layer by the downstream user) are part of an unmanaged solution 522. The runtime behavior 530 of entity 504 and sitemap 506 is defined by the top-most customizations at the unmanaged customizations 520 layer. Sitemap 506 and template component 516 are part of an unmanaged solution 524. The runtime behavior 530 of template component 516 is defined by the top-most customizations at the managed solutions 510 layer. A web resource 526, introduced is also introduced at the unmanaged solution 522 layer.

In some examples, LCAP 102 may be extended, if some business needs cannot be achieved via the no-code experience. Additional extensions points may be available for user 108 developers to achieve additional ALM functionality. For example, user 108 may create and register plugins for extra data validation, communication with services external to LCAP 102, initiation of automated processes based on a specific criteria, and other functionality.

Figure 7:
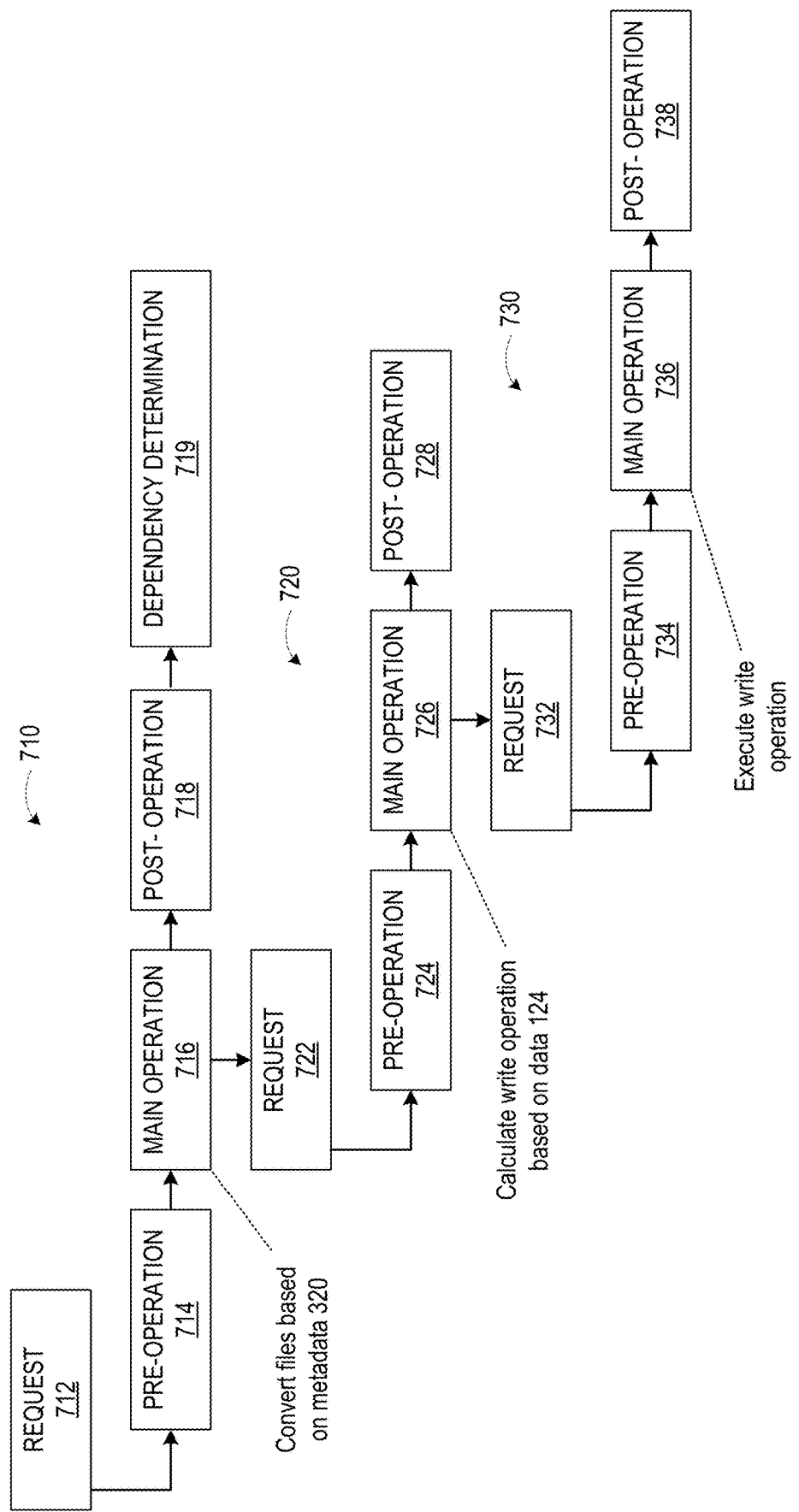
FIG. 7 illustrates a graphical depiction of importing, as may occur in the arrangement of FIG. 1.
Figure 8:
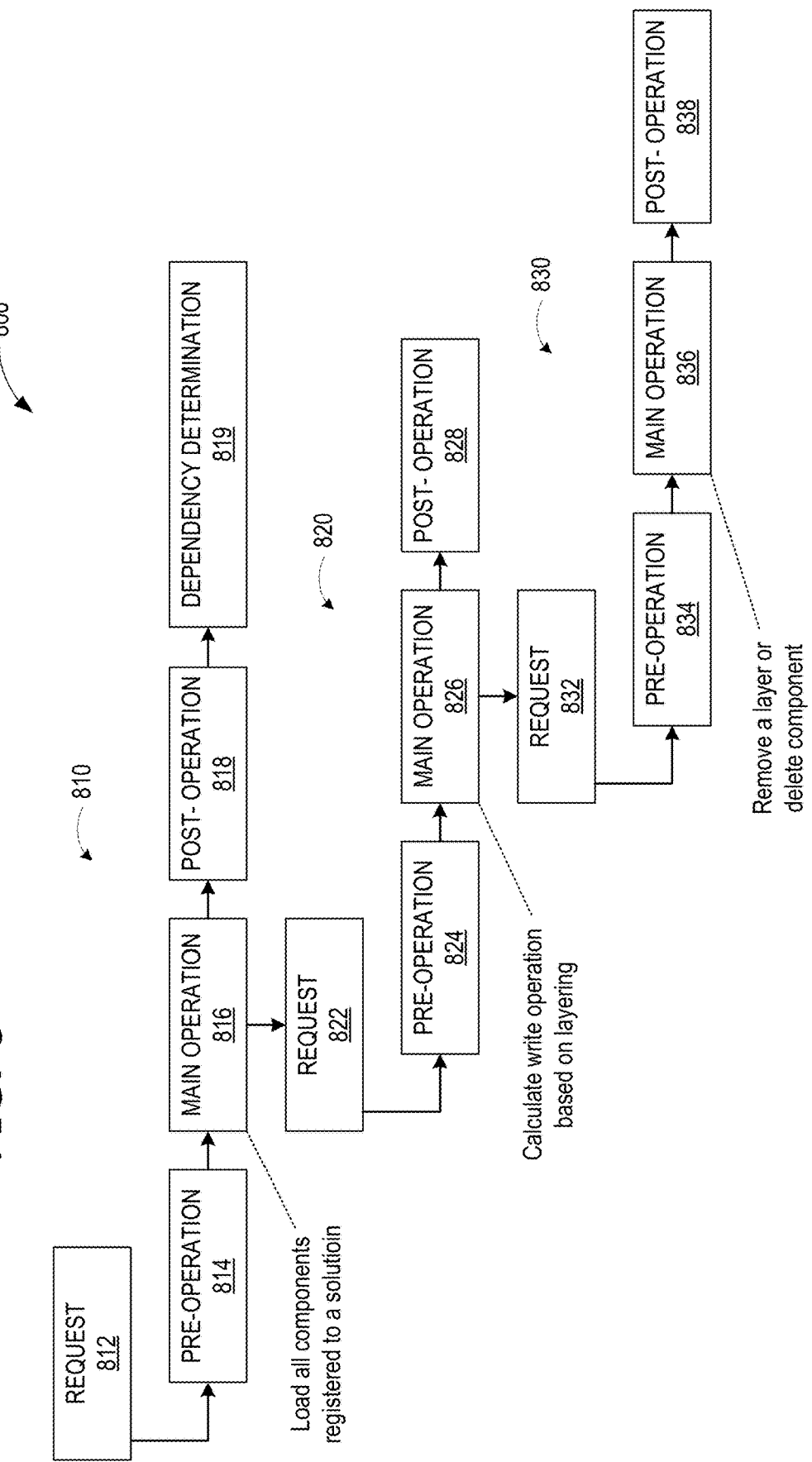
FIG. 8 illustrates a graphical depiction of uninstalling, as may occur in the arrangement of FIG. 1.

In addition to CRUD (create, update, delete, and retrieve), LCAP 102 provides additional extensibility points for consumption during solution events, such as export, import, and uninstall (together referred to as transport). Processes for export, import, and uninstall (and update) are illustrated in FIGS. 6, 7, and 8, respectively.

Figure 6:
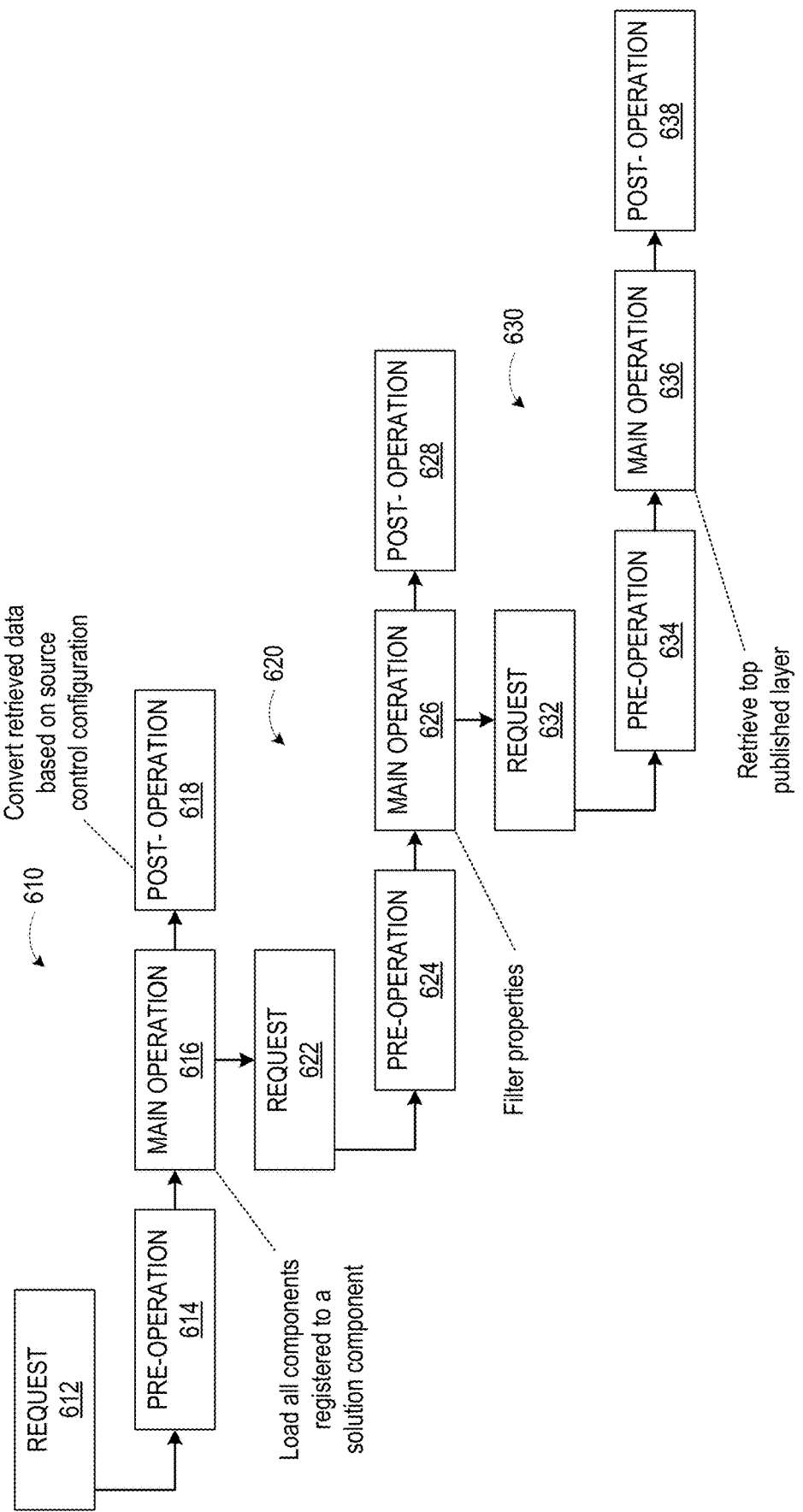
FIG. 6 illustrates a graphical depiction of exporting, as may occur in the arrangement of FIG. 1.

FIG. 6 illustrates a graphical depiction of an export process 600 for exporting a solution, which includes exporting solution components (e.g., components 111-113). An export handler loads records related to a solution from a table in metadata 300, populates a customization file (e.g., an XML file) for each component based on attributes marked as exportable (see FIG. 2B), adds localized labels for exportable attributes having HasMultipleLabels is marked as true (see FIG. 3C), determines missing components based on dependencies, and instantiates another pipeline for the missing components.

This operation is illustrated as having three tiers, a solution export tier 610, a component tier 620, and a third tier 630. The general scheme is a request triggering a pre-operation phase, then a main operation phase, and finally a post-operation phase. In a pre-operation phase, an input parameter is the instance of the component being processed. In a main operation phase, the operation to be performed is determined and either executed, or anther pipeline is invoked (or both, in some examples). For example, solution export tier 610 has an export solution request 612, a pre-operation 614, a main operation 616, and a post-operation 618. Main operation 616 loads all components registered to a solution, and post-operation 618 converts retrieved data based on source control configurations.

Component tier 620 has an export component request 622, a pre-operation 624, a main operation 626, and a post-operation 628. Main operation 626 filters properties of components. Third tier 630 has a retrieval request 632, a pre-operation 634, a main operation 636, and a post-operation 638. Main operation 636 retrieves the published top layers of components.

FIG. 7 illustrates a graphical depiction of an import process 700 for importing a solution, which includes importing solution components (e.g., components 111-113). An import handler determines needed operations and instantiates a new pipeline for each needed operations. This operation is also illustrated as having three tiers, a solution import tier 710, a component tier 720, and a third tier 730. The general scheme is a request triggering a pre-operation phase, then a main operation phase, and a post-operation phase, similar to exporting. For example, solution import tier 710 has an import solution request 712, a pre-operation 714, a main operation 716, and a post-operation 718. Main operation 716 converts solution files based on metadata 320 in target environment 120. For solution import tier 710, an additional phase, dependency determination 719, follows post-operation 718. Dependency determination 719 calculates (e.g., determines) and persists dependencies.

Component tier 720 has an import component request 722, a pre-operation 724, a main operation 726, and a post-operation 728. Main operation 726 calculates write operations based on data 124 present in target environment 120. In post-operation 728, user 108 may install additional custom logic. Third tier 730 has a create/update request 732, a pre-operation 734, a main operation 736, and a post-operation 738. Main operation 736 executes a write operation to write the files. In some examples, another dependency determination phase follows post-operation 738. In some examples, delete requests are not permitted during import/export operations.

FIG. 8 illustrates a graphical depiction of an uninstall process 800 for uninstalling a solution, which includes uninstalling solution components (e.g., components 111-113). An uninstall handler determines affected operations and instantiates a new pipeline for each needed operations. This operation is also illustrated as having three tiers, a solution uninstall tier 810, a component tier 820, and a third tier 830. The general scheme is a request triggering a pre-operation phase, then a main operation phase, and finally a post-operation phase, similar to exporting and importing. For example, solution import tier 810 has an uninstall solution request 812, a pre-operation 814, a main operation 816, and a post-operation 818. Main operation 816 loads all components registered to the solution being uninstalled. For solution uninstall tier 810, an additional phase, dependency determination 819, follows post-operation 818. Dependency determination 819 calculates (e.g., determines) dependencies in order to prevent deletion of a component having surviving dependencies (e.g., dependencies surviving the uninstallation).

Component tier 820 has an uninstall component request 822, a pre-operation 824, a main operation 826, and a post-operation 828. Main operation 826 calculates write operations based on current layering. Third tier 830 has a delete/update request 832, a pre-operation 834, a main operation 836, and a post-operation 838. Main operation 836 removes a layer (e.g., deletes a component) subject to dependency constraints. An update operation uses a combination of uninstallation and importing (e.g., both process depicted in FIGS. 8 and 7) to uninstall the obsolete solution and replace it with the updated solution (e.g., the updated components).

Figure 9:
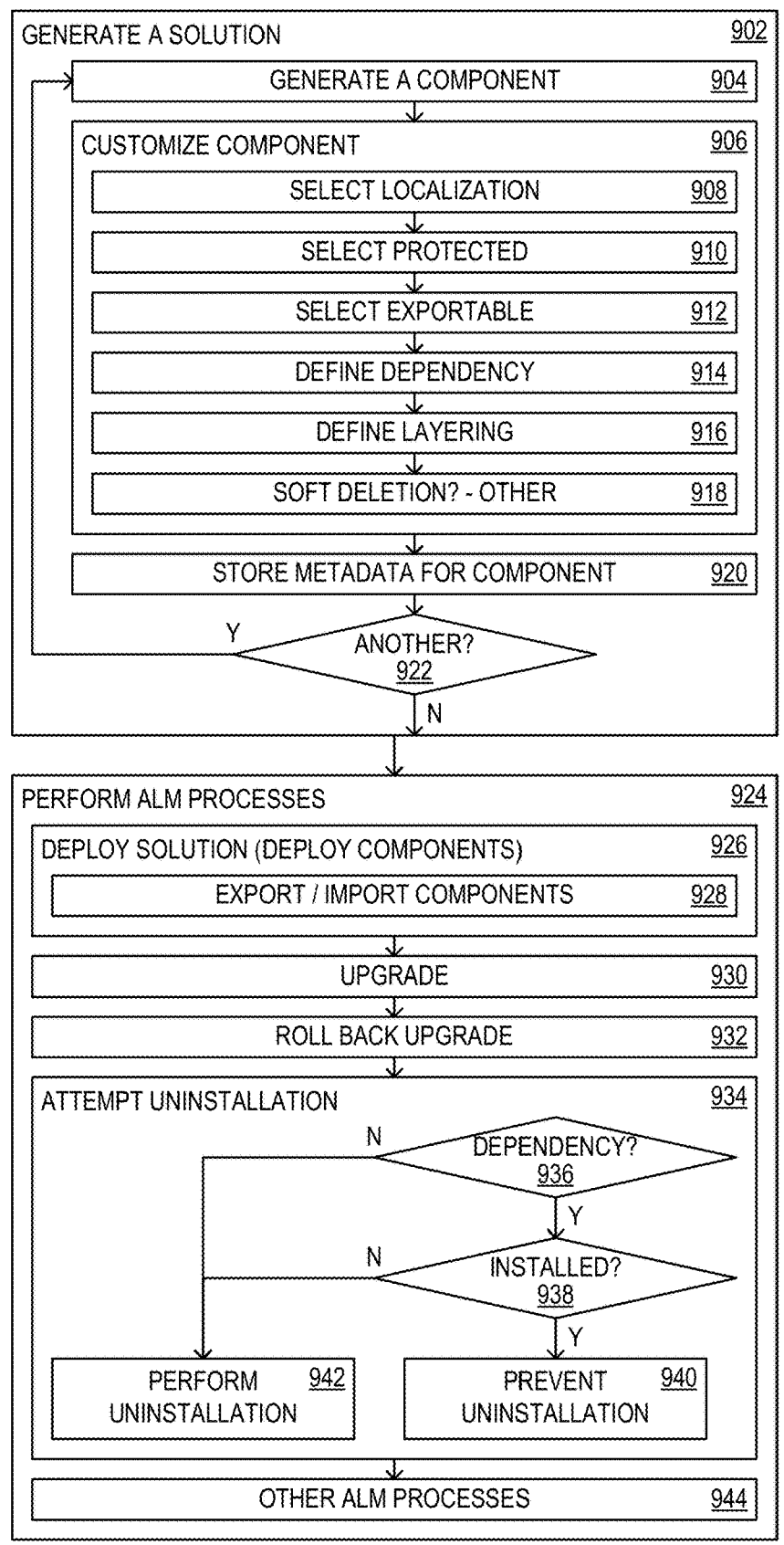
FIG. 9 is a flowchart illustrating exemplary operations that may be performed by the arrangement of FIG. 1.

FIG. 9 is a flowchart 900 illustrating exemplary operations (e.g., ALM processes) associated with arrangement 100. In some examples, operations described for flowchart 900 are performed by computing device 1100 of FIG. 11. Flowchart 900 commences with operation 902, which generates a solution 114 (comprising components 111-113) using LCAP 102, and is performed with operations 904-920. In some examples, LCAP 102, comprises a Solution Component Framework. Operation 904 includes, within LCAP 102, generating component 111 (e.g., a first component). In some examples, user 108 is able to generate component 111 without the user having to write code.

Operation 906, customizing component 111, is performed using one or more operations 908-918, and involves creating extensibility points for ALM operations. In some examples, the ALM operations comprising create, update, delete, retrieve, import, export, uninstall, and publish. Operation 908 includes indicating whether component 111 is subject to localization. For example, indicating includes updating metadata 300 based on a selection made by user 108 via a UI. Operation 910 includes indicating whether component 111 is protected from downstream modification (e.g., changes by another user). Operation 912 includes indicating whether component 111 is exportable. Operation 914 includes defining dependency for component 111 (e.g., based on a UI selection by user 108). Operation 916 includes defining a layering of component 111, for example by determining the most current change or modification. Operation 918 includes marking component 111 for soft deletion. LCAP 102 receives selections and markings provided by user 108 in operations 908-918, and internally indicates or otherwise records those selections (e.g., updates metadata 300).

Operation 920 stores metadata 300 for component 111, and decision operation 922 determines whether user 108 will generate or modify another component (e.g., component 112). If so, flowchart 900 returns to operation 904. Operation 906 is performed for the next component, such as component 112 and later, for component 113. For example, operation 906 generates component 112 (e.g., a second component), in some examples without writing code (e.g., by the user), and customizes component 112 in accordance with customizing component 112. This includes creating extensibility points for ALM operations.

When applied to component 112, operations 908-918 respectively: indicate whether component 112 is subject to localization; indicate whether component 112 is protected from downstream modification; indicate whether component 112 is exportable; define a dependency of component 112 (e.g., on component 111); define a layering of component 112; and mark component 112 for soft deletion.

Operation 924 performs ALM processes on component 111 and component 112 using operations 926-944. Operation 926 deploys component 111 and component 112 using operation 928. Operation 928 includes exporting component 111 and component 112 (see FIG. 6), and importing component 111 and component 112 (see FIG. 7). Operation 930 upgrades component 111 and component 112, and operation 932 rolls back an upgrade of component 111 and/or component 112.

Operation 934 includes attempting an uninstallation of component 111, and is performed with operations 936-942. Decision operations 936 and 938 determine dependencies involving component 111. Decision operation 936 determines whether another component is dependent on component 111, and if so, decision operation 938 determines whether that other component remains installed (or is also scheduled for uninstallation or has already been uninstalled). If both conditions are true (another component is dependent on component 111, and that other component remains installed), flowchart proceeds to operation 940. Otherwise, if one condition is not met, flowchart proceeds to operation 942.

Operation 940 includes, based on at least component 112 remaining installed and the dependency of component 112 on component 111 remaining, preventing uninstalling component 111. Operation 942 includes, based on at least component 112 being uninstalled or the dependency of component 112 on component 111 not remaining, permitting uninstalling component 111. Other ALM process are accomplished in operation 944.

Figure 10:
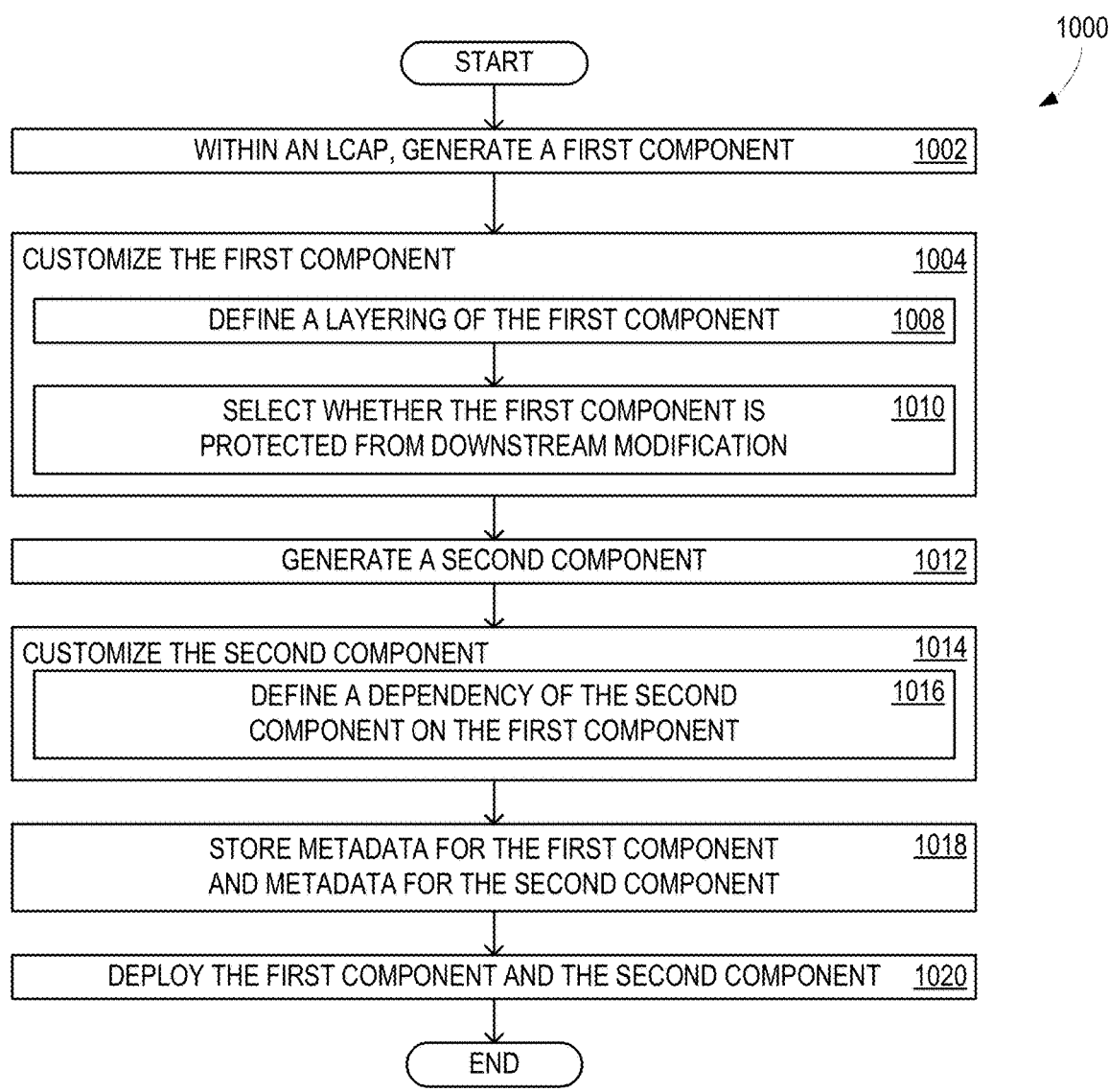
FIG. 10 is another flowchart illustrating exemplary operations that may performed by the arrangement of FIG. 1.

FIG. 10 is a flowchart 1000 illustrating exemplary operations associated with arrangement 100. In some examples, operations described for flowchart 1000 are performed by computing device 1100 of FIG. 11. Flowchart 1000 commences with operation 1002, which includes generating a first component within an LCAP. Operation 1004 includes customizing the first component, which is performed using operations 1006-1010. Operation 1008 includes defining a layering of the first component. Operation 1010 includes indicating whether the first component is protected from downstream modification Operation 1012 includes generating a second component. Operation 1014 includes customizing the second component in accordance with customizing the first component (e.g., performing equivalents of operation 1006-1010 for the second component). Operation 1014 further includes operation 1016, which defines a dependency of the second component on the first component. Operation 1018 includes storing metadata for the first component and metadata for the second component. Operation 1020 includes deploying the first component and the second component.

Additional Examples

An example method of ALM comprises: within an LCAP, generating a first component; customizing the first component, wherein customizing the first component comprises: defining a layering of the first component; and indicating whether the first component is protected from downstream modification; generating a second component; customizing the second component in accordance with customizing the first component, wherein customizing the second component further comprises: defining a dependency of the second component on the first component; storing first metadata for the first component representing the customizations of the first component, storing second metadata for the second component representing the customizations of the second component; and deploying the first component and the second component with the first metadata and the second metadata.

An example system for ALM comprises: a processor; and a computer-readable medium storing instructions that are operative upon execution by the processor to: within an LCAP, generate a first component; customize the first component, wherein customizing the first component comprises: defining a layering of the first component; and indicating whether the first component is protected from downstream modification; generate a second component; customize the second component in accordance with customizing the first component, wherein customizing the second component further comprises: defining a dependency of the second component on the first component; store first metadata for the first component representing the customizations of the first component; store second metadata for the second component representing customizations of the second component; and deploy the first component and the second component with the first metadata and the second metadata.

One or more example computer storage devices has computer-executable instructions stored thereon, which, on execution by a computer, cause the computer to perform operations comprising: within an LCAP, generating a first component; customizing the first component, wherein customizing the first component comprises: defining a layering of the first component; and indicating whether the first component is protected from downstream modification; generating a second component; customizing the second component in accordance with customizing the first component, wherein customizing the second component further comprises: defining a dependency of the second component on the first component; storing first metadata for the first component representing the customizations of the first component; storing second metadata for the second component representing the customizations of the second component; and deploying the first component and the second component with the first metadata and the second metadata.

Alternatively, or in addition to the other examples described herein, examples include any combination of the following:
exporting the first component;
exporting the second component;
importing the first component;
importing the second component;
upgrading the first component;
upgrading the second component;
based on at least the second component remaining installed and the dependency of the second component on the first component remaining, preventing uninstalling the first component;
based on at least the second component being uninstalled or the dependency of the second component on the first component not remaining, permitting uninstalling the first component;
generating the first component and generating the second component comprises generating both the first component and the second component without writing code;
creating extensibility points for ALM operations;
the ALM operations comprise create, update, delete, retrieve, import, export, uninstall, and publish;
selecting whether the first component is exportable;
receive a selection of whether the first component is exportable;
selecting whether the second component is exportable;
receive a selection of whether the second component is exportable;
defining the dependency of the second component on the first component comprises defining the dependency using a UI selection;
marking the first component for soft deletion;
marking the second component for soft deletion;
rolling back an upgrade of the first component;
rolling back an upgrade of the second component; and
the LCAP comprises a solution component framework.

While the aspects of the disclosure have been described in terms of various examples with their associated operations, a person skilled in the art would appreciate that a combination of operations from any number of different examples is also within scope of the aspects of the disclosure.

Example Operating Environment

Figure 11:
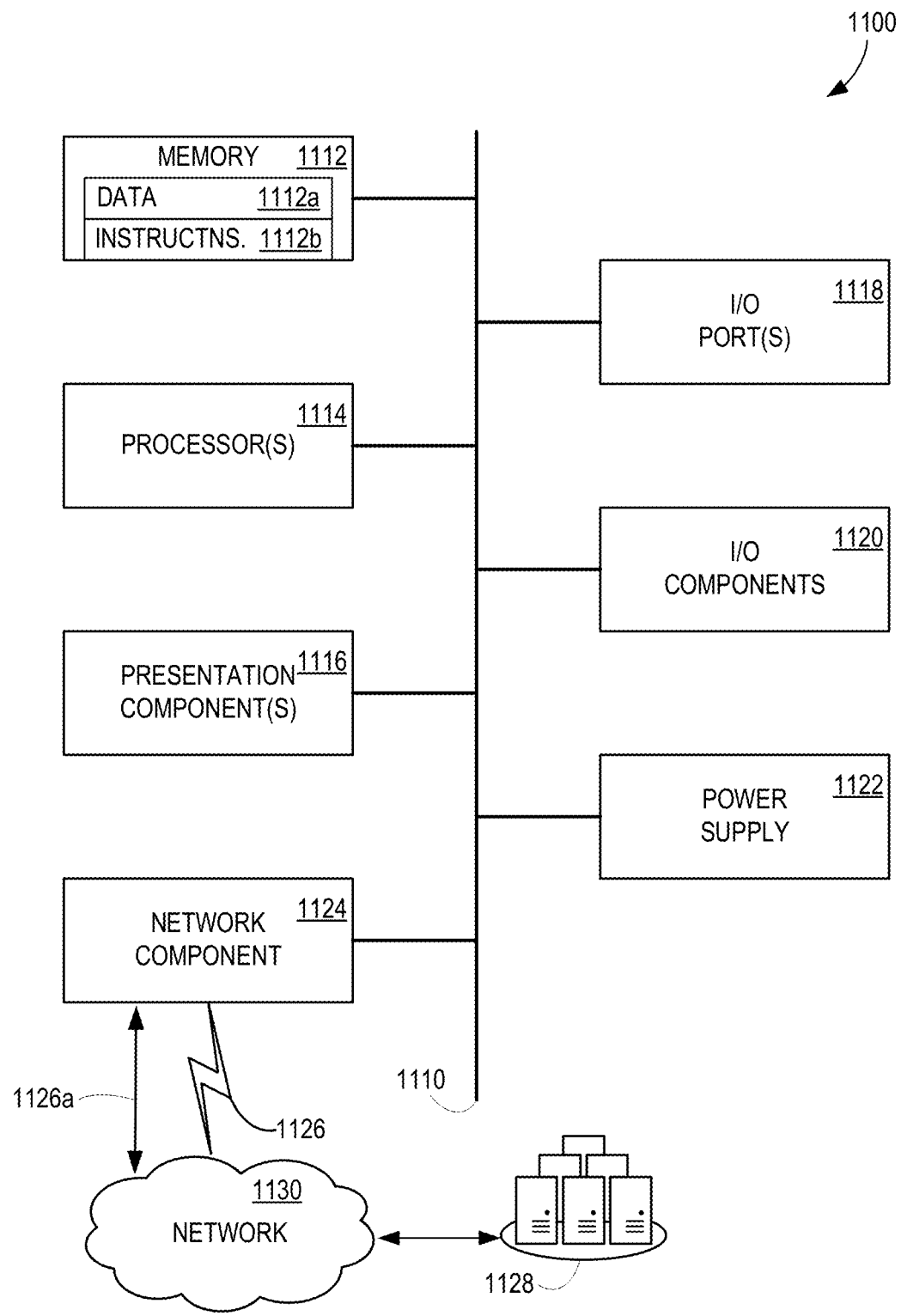
FIG. 11 is a block diagram of an example computing environment suitable for implementing some of the various examples disclosed herein.

FIG. 11 is a block diagram of an example computing device 1100 for implementing aspects disclosed herein, and is designated generally as computing device 1100. In some examples, one or more computing devices 1100 are provided for an on-premises computing solution. In some examples, one or more computing devices 1100 are provided as a cloud computing solution. In some examples, a combination of on-premises and cloud computing solutions are used. Computing device 1100 is but one example of a suitable computing environment and is not intended to suggest any limitation as to the scope of use or functionality of the examples disclosed herein, whether used singly or as part of a larger set. Neither should computing device 1100 be interpreted as having any dependency or requirement relating to any one or combination of components/modules illustrated.

The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1100 includes a bus 1110 that directly or indirectly couples the following devices: computer-storage memory 1112, one or more processors 1114, one or more presentation components 1116, input/output (I/O) ports 1118, I/O components 1120, a power supply 1122, and a network component 1124. While computing device 1100 is depicted as a seemingly single device, multiple computing devices 1100 may work together and share the depicted device resources. For example, memory 1112 may be distributed across multiple devices, and processor(s) 1114 may be housed with different devices.

Bus 1110 represents what may be one or more busses (such as an address bus, data bus, or a combination thereof). Although the various blocks of FIG. 11 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 11 and the references herein to a "computing device." Memory 1112 may take the form of the computer storage media and operatively provide storage of computer-readable instructions, data structures, program modules and other data for the computing device 1100. In some examples, memory 1112 stores one or more of an operating system, a universal application platform, or other program modules and program data. Memory 1112 is thus able to store and access data 1112a and instructions 1112b that are executable by processor 1114 and configured to carry out the various operations disclosed herein.

Memory 1112 may include any quantity of memory associated with or accessible by the computing device 1100. Memory 1112 may be internal to the computing device 1100 (as shown in FIG. 11), external to the computing device 1100 (not shown), or both (not shown). Examples of memory 1112 include any computer storage media for encoding desired information and for access by the computing device 1100. Additionally, or alternatively, the memory 1112 may be distributed across multiple computing devices 1100, for example, in a virtualized environment in which instruction processing is carried out on multiple computing devices 1100. For the purposes of this disclosure, "computer storage media," "computer storage memory," "memory," and "memory devices" are synonymous terms for the memory 1112, and none of these terms include carrier waves or propagating signaling.

Processor(s) 1114 may include any quantity of processing units that read data from various entities, such as memory 1112 or I/O components 1120. Specifically, processor(s) 1114 are programmed to execute computer-executable instructions for implementing aspects of the disclosure. The instructions may be performed by the processor, by multiple processors within the computing device 1100, or by a processor external to the client computing device 1100. In some examples, the processor(s) 1114 are programmed to execute instructions such as those illustrated in the flow charts discussed below and depicted in the accompanying drawings. Moreover, in some examples, the processor(s) 1114 represent an implementation of analog techniques to perform the operations described herein. For example, the operations may be performed by an analog client computing device 1100 and/or a digital client computing device 1100. Presentation component(s) 1116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1100, across a wired connection, or in other ways. I/O ports 1118 allow computing device 1100 to be logically coupled to other devices including I/O components 1120, some of which may be built in. Example I/O components 1120 include, for example but without limitation, a microphone, joystick, game pad, satellite dish, scanner, printer, wireless device, etc.

The computing device 1100 may operate in a networked environment via the network component 1124 using logical connections to one or more remote computers. In some examples, the network component 1124 includes a network interface card and/or computer-executable instructions (e.g., a driver) for operating the network interface card. Communication between the computing device 1100 and other devices may occur using any protocol or mechanism over any wired or wireless connection. In some examples, network component 1124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1124 communicates over wireless communication link 1126 and/or a wired communication link 1126a to a cloud resource 1128 across network 1130. Various different examples of communication links 1126 and 1126a include a wireless connection, a wired connection, and/or a dedicated link, and in some examples, at least a portion is routed through the internet.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for application lifecycle management, the system comprising:
   a processor; and
   a computer storage medium storing instructions that are operative upon execution by the processor to:
     generate a first component within an application platform;
     customize the first component, wherein first metadata for the customized first component comprises:
       an indication whether the first component is protected from downstream modification, and
       an indication whether the first component is subject to localization;
     generate a second component;
     customize the second component in accordance with customizing the first component, wherein second metadata for the customized second component comprises:
       a dependency of the second component on the first component;
     deploy, in a target environment, the first component and the second component with the first metadata representing the customized first component and the second metadata representing the customized second component; and
     at least one of:
       prevent uninstalling of the first component when the second component remains installed and the dependency of the second component on the first component remains, or
       permit uninstalling of the first component when the second component is uninstalled or the dependency of the second component on the first component does not remain.

2. The system of claim 1, wherein generating the first component and generating the second component comprises generating both the first component and the second component without writing code.

3. The system of claim 1, wherein the instructions are further operative to:
   create extensibility points for application lifecycle management operations, the application lifecycle management operations comprising create, update, delete, retrieve, import, export, uninstall, and publish.

4. The system of claim 1, wherein the instructions are further operative to:
   receive a selection of whether the first component is exportable; and
   receive a selection of whether the second component is exportable.

5. The system of claim 1, wherein the dependency of the second component on the first component is defined by a user interface selection.

6. The system of claim 1, wherein the instructions are further operative to:
 export the first component;
 import the first component; and
 upgrade the first component.

7. The system of claim 1, wherein the instructions are further operative to at least one of: mark the first component for soft deletion or mark the second component for soft deletion.

8. A method of application lifecycle management, the method comprising:
 generating a first component within an application platform;
 customizing the first component, wherein first metadata for the customized first component comprises:
  an indication whether the first component is protected from downstream modification, and
  an indication whether the first component is subject to localization;
 generating a second component;
 customizing the second component in accordance with customizing the first component, wherein second metadata for the customized second component comprises:
  a dependency of the second component on the first component;
 deploying, in a target environment, the first component and the second component with the first metadata representing the customized first component and the second metadata representing the customized second component; and
 at least one of:
  preventing uninstalling of the first component when the second component remains installed and the dependency of the second component on the first component remains, or
  permitting uninstalling of the first component when the second component is uninstalled or the dependency of the second component on the first component does not remain.

9. The method of claim 8, further comprising:
 exporting the first component;
 importing the first component; and
 upgrading the first component.

10. The method of claim 8, wherein generating the first component and generating the second component comprises generating both the first component and the second component without writing code.

11. The method of claim 8, further comprising:
 creating extensibility points for application lifecycle management operations, the application lifecycle management operations comprising create, update, delete, retrieve, import, export, uninstall, and publish.

12. The method of claim 8, further comprising:
 indicating whether the first component is exportable; and
 indicating whether the second component is exportable.

13. The method of claim 8, wherein the dependency of the second component on the first component is defined by a user interface selection.

14. The method of claim 8, further comprising:
 marking the first component for soft deletion; or
 marking the second component for soft deletion.

15. One or more computer storage media having computer-executable instructions stored thereon, which, on execution by a processor, cause the processor to perform operations comprising:
 generating a first component within an application platform;
 customizing the first component, wherein first metadata for the customized first component comprises:
  an indication whether the first component is protected from downstream modification, and
  an indication whether the first component is subject to localization;
 generating a second component;
 customizing the second component in accordance with customizing the first component, wherein second metadata for the customized second component comprises:
  a dependency of the second component on the first component;
 deploying, in a target environment, the first component and the second component with the first metadata representing the customized first component and the second metadata representing the customized second component; and
 at least one of:
  preventing uninstalling of the first component when the second component remains installed and the dependency of the second component on the first component remains, or
  permitting uninstalling of the first component when the second component is uninstalled or the dependency of the second component on the first component does not remain.

16. The one or more computer storage media of claim 15, wherein the operations further comprise:
 exporting the first component;
 importing the first component; and
 upgrading the first component.

17. The one or more computer storage media of claim 15, wherein generating the first component and generating the second component comprises generating both the first component and the second component without writing code.

18. The one or more computer storage media of claim 15, wherein the operations further comprise:
 creating extensibility points for application lifecycle management operations, the application lifecycle management operations comprising create, update, delete, retrieve, import, export, uninstall, and publish.

19. The one or more computer storage media of claim 15, wherein the operations further comprise:
 selecting whether the first component is exportable; and
 selecting whether the second component is exportable.

20. The one or more computer storage media of claim 15, wherein the dependency of the second component on the first component is defined by a user interface selection.

* * * * *